3,297,717
SULFONAMIDO INDOLE DERIVATIVES
William A. Gould and Aubrey A. Larsen, Evansville, Ind., assignors to Mead Johnson & Company, Evansville, Ind., a corporation of Indiana
No Drawing. Filed Oct. 4, 1965, Ser. No. 492,836
8 Claims. (Cl. 260—326.12)

This invention is concerned with indole derivatives having the formula shown below. They are useful as depressants for the central nervous system, as hypothermic agents, and as chemical intermediates.

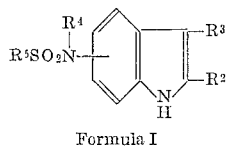

Formula I

In Formula I, $R^2$ and $R^3$ are hydrogen atoms or lower alkyl groups of up to 4 carbon atoms. The substituent group indicated by

is located in any of the 4, 5, 6, or 7-positions of the indole ring. $R^4$ is a lower alkyl group of up to 4 carbon atoms or it is a hydrogen atom. $R^5$ is a group having a carbon skeleton selected from lower alkyl, alkenyl, cycloalkyl, or cycloalkenyl having up to 6 carbon atoms, phenyl, naphthyl, substituted phenyl, or substituted naphthyl. The phenyl and naphthyl substituents may be lower alkyl, alkenyl, cycloalkyl, or cycloalkenyl of up to 6 carbon atoms, halogen, including chlorine, bromine, iodine, and fluorine, lower alkoxy of up to 6 carbon atoms, or benzyloxy.

These substances are prepared by reaction of the appropriate aminoindole in which the substituent $R^4NH$ is attached at the 4, 5, 6, or 7-positions of the indole ring with an alkyl or arylsulfonyl halide or anhydride of the formula $R^5SO_2X$, wherein X is chlorine, bromine, iodine, or $R^5SO_2O$. The reaction scheme shown in Equation 1 illustrates this method of preparation.

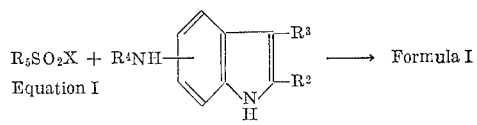

The process of Equation 1 is carried out under conventional conditions for the preparation of sulfonamides, preferably by reaction of the aminoindole and sulfonyl halide or anhydride in an inert solvent or liquid diluent at moderate temperature, e.g. 20–100° C. The presence of a base such as sodium hydroxide, or potassium hydroxide or an organic base such as pyridine or other tertiary amine is of assistance when employing a sulfonyl halide reactant. Pyridine serves quite satisfactorily both as base and diluent. This is the preferred reaction medum for laboratory preparation.

A two-step method of preparation of the compounds of Formula I in which $R^4$ is lower alkyl involves as a second step alkylation of a sulfonamide of Formula I in which $R^4$ is hydrogen. The latter are obtained in a first step carried out according to Equation 1. An alkyl halide or other reactive alkyl ester suitable for the alkylation of sulfonamides serves as alkylating agent. This method is illustrated in Equation 2 in which $R^6$ is lower alkyl and Y is chloride, bromide, iodide, sulfate, or phosphate. $R^2$, $R^3$, and $R^5$ have the same meaning as above.

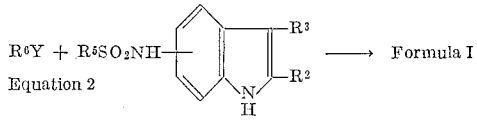

The process of Equation 2 is ordinarily carried out by first forming a metal salt of the sulfonamido indole reactant and then reacting therewith the alkylating agent $R^6Y$. The alkali metal salts such as the sodium and potassium salts are preferred in the ordinary case due to their reactivity and ease of preparation. Suitable alkylating agents, $R^6Y$, include methyl iodide, dimethylsulfate, triethylphosphate, butyl iodide, etc.

The alkali and alkaline earth metal salts of the sulfonamido indoles of Formula I wherein $R^4$ is H are considered part of the present invention. Not only are they useful for the process outlined in Equation 2, but they are also useful pharmaceutical forms of the present products. The salts are prepared by reaction of the sulfonamidoindole of Formula I in which $R^4$ is hydrogen with the hydroxide or alkoxide of the selected alkali or alkaline earth metal. A simple acid-base neutralization reaction is involved. A convenient means for carrying out the reaction is to employ a volatile solvent in which both the sulfonamido-indole reactant and the alkali or alkaline earth base are soluble and to then simply evaporate the solvent after reaction of the indole and base in chemically equivalent amounts.

To make use of the central nervous system depressant and hypothermic activities of the present substances, they may be administered to animals in non-toxic dosages in the range of about 100 mg./kg. of body weight up to the toxic limit thereof. The $ALD_{50}$ values for the mouse treated orally with the present substances are of the order of 1000 to 2000 mg./kg. of body weight. In some instances the $ALD_{50}$ values are in excess of 2000 mg./kg.

To illustrate, when 100 mg./kg. of body weight of 6-methanesulfonamidoindole is administered orally to mice, a drop in body temperature of about 2° C. is observed. The same substance in oral doses to mice of 500 mg./kg. elicits signs of CNS depression, and a reduction of body temperature of about 5° C. In oral doses of 1000 mg./kg. mice exhibit a decrease in body temperature of about 13° C. The $ALD_{50}$ is in excess of 2000 mg./kg.

The compounds of the present invention may be administered orally, rectally, or parenterally. They may be formulated with conventional pharmaceutical carriers as tablets, capsules, liquid suspensions or solutions for oral or parenteral use, as suppositories, etc.

EXAMPLE 1

*5-methanesulfonamidoindole*

(a) *5-aminoindole.*—This compound has been described by G. Cavallini et al. in Il Farmaco (Pavia) Scientific Edition, vol. 13, page 105 (1958) (Chem. Abstracts 52, 20126H (1958)). 5-nitroindole, 15.0 g. (0.094 mole), and 0.5 g. of 10% palladium-on-carbon catalyst are suspended in 200 ml. of absolute ethanol and hydrogenated at 60 p.s.i. in a closed system until the pressure drop corresponds to that calculated for the amount of hydrogen needed to complete the reduction. The reaction mixture is then removed from the apparatus, the catalyst removed by filtration, and the filtrate concentrated to dryness at reduced pressure. The residue is triturated with isopropanol and collected on the filter; yield, 9.2 g. (75%), M.P. 131–134° C. This value is in substantial agreement with the value reported by Cavallini et al.

(b) *5 - methanesulfonamidoindole.*—Methanesulfonyl chloride, 8.0 g. (0.07 mole), is added in dropwise fashion with stirring to a cooled solution of 9.2 g. (0.07 mole) of 5-aminoindole in 50 ml. of pyridine. The reaction mixture is kept at room temperature for about 4 hrs., warmed to 65–70° C. for about 15 min., and the poured into 500 ml. of ice water with stirring. After the precipitated material solidifies, it is collected on a filter, washed with water, and recrystallized from isopropanol; yield, 8.9 g. (63%), M.P. 135–139° C. A small portion is recrystallized for analysis employing the same solvent; M.P. 135.5–137° C.

*Analysis.*—Calcd. for $C_9H_{10}N_2O_2S$: C, 51.41; H, 4.79; N, 13.33; S, 15.25. Found: C, 51.56; H, 5.10; N, 13.39; S, 15.48.

EXAMPLES 2–13

The procedures of Example 1 are applied to various nitroindoles to provide the corresponding methanesulfonamidoindoles. The nitroindoles and corresponding products are listed in Table I.

EXAMPLE 27

*5-(N-methylmethanesulfonamido)indole*

5-methanesulfonamidoindole, 17.5 g. (0.083 mole) and 9.1 ml. of 9.15 N aqueous sodium hydroxide (0.083 mole) are mixed in 350 ml. of ethanol and a solution of 10 ml. (0.16 mole) of methyl iodide in 25 ml. of ethanol is added thereto in dropwise fashion with stirring. Approximately 2 hrs. is allowed for the reaction to come to completion at room temperature, and the solvent and other volatile constituents are distilled in vacuo. The residue is triturated with water and the solid material collected on a filter. It is recrystallized from isopropanol, M.P. 123–125° C.

*Analysis.*—Calcd. for $C_{10}H_{12}N_2O_2S$: C, 53.55; H, 5.40; S, 14.29. Found: C, 53.43; H, 5.49; S, 14.08.

EXAMPLE 28

*5-methanesulfonamidoindole sodium salt*

The procedure of Example 27 is repeated, omitting the addition of methyl iodide. Evaporation of the solution of 5-methanesulfonamidoindole and sodium hydroxide yields the sodium salt of the indole derivative.

Other metal salts may be prepared in the fashion described in Example 28 by substitution of an equivalent of the appropriate base such as calcium hydroxide, barium hydroxide, lithium hydroxide, or potassium hydroxide for the sodium hydroxide.

TABLE I.—ADDITIONAL METHANESULFONAMIDOINDOLES

| Example No. | Starting Material | Product |
| --- | --- | --- |
| 2 | 4-nitroindole | 4-methanesulfonamidoindole. |
| 3 | 6-nitroindole | 6-methanesulfonamidoindole.[1] |
| 4 | 7-nitroindole | 7-methanesulfonamidoindole.[2] |
| 5 | 3-methyl-7-nitroindole | 3-methyl-7-methanesulfonamidoindole. |
| 6 | 2-methyl-6-nitroindole | 2-methyl-6-methanesulfonamidoindole. |
| 7 | 2-methyl-5-nitroindole | 2-methyl-5-methanesulfonamidoindole. |
| 8 | 2 methyl-7-nitroindole | 2-methyl-7-methanesulfonamidoindole. |
| 9 | 3-ethyl-5-nitroindole | 3-ethyl-5-methanesulfonamidoindole. |
| 10 | 2,3-dimethyl-6-nitroindole | 2,3-dimethyl-6-methanesulfonamidoindole. |
| 11 | 3-ethyl-6-nitroindole | 3-ethyl-6-methanesulfonamidoindole. |
| 12 | 3-ethyl-4-nitroindole | 3-ethyl-4-methanesulfonamidoindole. |
| 13 | 2-(n-butyl)-5-nitroindole | 2-(n-butyl)-5-methanesulfonamidoindole. |
| 14 | 2-(n-propyl)-6-nitroindole | 2-(n-propyl)-6-methanesulfonamidoindole. |

[1] 6-methanesulfonamidoindole was obtained in 69% yield; recrystallized from aqueous isopropanol, M.P. 133.5–135° C. Anal.: C, 51.50; H, 5.08; S. 15.16.
[2] 7-methanesulfonamidoindole was obtained in 71% yield; recrystallized from isopropanol, M.P. 158–159.5° C. Anal.: C, 51.64; H, 5.01; S, 14.94.

EXAMPLES 15–25

The procedure of Example 1 is modified for the preparation of a variety of other 5-$R^5SO_2NH$ indoles by substitution of other sulfonyl halides or anhydrides, $R^5SO_2X$, for methanesulfonyl chloride. The sulfonyl halide or anhydride reactants and resulting indole products are listed in Table II.

TABLE II.—VARIOUS 5-$R^5SO_2NH$ INDOLES

| Example No. | Starting Material | Product |
| --- | --- | --- |
| 15 | Hexanesulfonyl chloride | 5-Hexanesulfonamidoindole. |
| 16 | Benzenesulfonyl chloride | 5-Benzenesulfonamidoindole. |
| 17 | p-Toluenesulfonyl chloride | 5-(p-Toluenesulfonamido)indole. |
| 18 | o-Chlorobenzenesulfonyl chloride. | 5-(o-Chlorobenzenesulfonamido)indole. |
| 19 | m-Bromobenzenesulfonyl bromide. | 5-(m-Bromobenzenesulfonamido)indole. |
| 20 | p-Fluorobenzenesulfonyl chloride. | 5-(p-Fluorobenzenesulfonamido)indole. |
| 21 | p-Methoxybenzenesulfonyl chloride. | 5-(p-Methoxybenzene sulfonamido)indole. |
| 22 | α-Naphthalenesulfonyl chloride. | 5-(α-Naphthalenesulfonamido)indole. |
| 23 | 2-Methoxynaphthalene-7-sulfonyl chloride. | 5-(2-Methoxynaphthalene-7-sulfonamido)-indole. |
| 24 | 2,5-Dimethylbenzenesulfonyl chloride. | 5-(2,5-Dimethylbenzenesulfonamido)-indole. |
| 25 | 2,5-Dichlorobenzenesulfonyl chloride. | 5-(2,5-Dichlorobenzenesulfonamido)indole. |
| 26 | Methanesulfonic anhydride | 5-Methanesulfonamidoindole. |

What is claimed is:
1. A compound having the formula

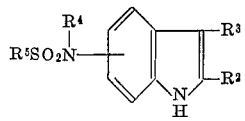

wherein the group

is located in any of the 4, 5, 6, or 7-positions of the indole ring, and
$R^2$ and $R^3$ are hydrogen atoms or lower alkyl groups of up to 4 carbon atoms;
$R^4$ is hydrogen or lower alkyl of up to about 4 carbon atoms;
$R_5$ is lower alkyl, alkenyl, cycloalkyl, or cycloalkenyl having up to 6 carbon atoms, phenyl, or naphthyl, substituted phenyl, or substituted naphthyl wherein said substituent is lower alkyl, alkenyl, cycloalkyl, or cycloalkenyl of up to 6 carbon atoms, halogen, lower alkoxy of up to 6 carbon atoms, or benzyloxy.

2. The alkali and alkaline earth metal salts of the compounds of claim 1 wherein $R^4$ is hydrogen.
3. 4-methanesulfonamidoindole.
4. 5-methanesulfonamidoindole.
5. 6-methanesulfonamidoindole.
6. 7-methanesulfonamidoindole.
7. 5-(N-methylmethanesulfonamido)indole.
8. 5-methanesulfonamidoindole sodium salt.

No references cited.

ALEX MAZEL, *Primary Examiner.*

MARY U. O'BRIEN, *Assistant Examiner.*